(12) United States Patent
Pontier et al.

(10) Patent No.: US 8,806,345 B2
(45) Date of Patent: Aug. 12, 2014

(54) INFORMATION EXCHANGE USING GENERIC DATA STREAMS

(75) Inventors: Laurent Pontier, Bailly (FR); Bruno Dumant, Verneuil sur Seine (FR)

(73) Assignee: Business Objects Software Limited, Dublin (IE)

( * ) Notice: Subject to any disclaimer, the term of this patent is extended or adjusted under 35 U.S.C. 154(b) by 710 days.

(21) Appl. No.: 12/634,867

(22) Filed: Dec. 10, 2009

(65) Prior Publication Data
US 2011/0145712 A1 Jun. 16, 2011

(51) Int. Cl.
*G06F 3/00* (2006.01)

(52) U.S. Cl.
USPC .......................................................... 715/738

(58) Field of Classification Search
USPC ............ 709/230, 231; 707/955; 715/764, 765
See application file for complete search history.

(56) References Cited

U.S. PATENT DOCUMENTS

| | | | | |
|---|---|---|---|---|
| 6,799,184 | B2 * | 9/2004 | Bhatt et al. | 707/718 |
| 7,730,388 | B2 * | 6/2010 | Blanding et al. | 715/200 |
| 7,840,619 | B2 * | 11/2010 | Horn | 707/829 |
| 8,108,830 | B2 * | 1/2012 | Bibr et al. | 717/107 |
| 2004/0177319 | A1 * | 9/2004 | Horn | 715/501.1 |
| 2005/0057560 | A1 * | 3/2005 | Bibr et al. | 345/418 |
| 2005/0131930 | A1 * | 6/2005 | Jang et al. | 707/101 |
| 2005/0289601 | A1 * | 12/2005 | Park et al. | 725/54 |
| 2009/0157630 | A1 * | 6/2009 | Yuan | 707/3 |

OTHER PUBLICATIONS

IBM Corporation; Event monitor self-describing data stream; IBM DB2 Database for Linux, UNIX, and Windows Information Center, 2009; IBM Corporation (http://publib.boulder.ibm.com/infocenter/db2luw/v9/index.jsp?topic=/com.ibm.db2.udb.admin.doc/doc/c0007493.htm).

Daniel J. Dailey, Stuart Maclean, Fritz W. Cathey, D. Meyers; A Self-Describing Data Transfer Model for ITS Applications; IEEE Transactions on Intelligent Transportation Systems, Vol. 3, No. 4, Dec. 2002; IEEE (http://www.its.washington.edu/pubs/itsc_trans_dec_2002.pdf).

Eric Browne; The myth of self-describing XML; Sep. 2003 (http://workflow.healthbase.info/monographs/XML_myths_Browne.pdf).

Sandip Agarwala, Greg Eisenhauer, and Karsten Schwan; Morphable Messaging: Efficient Support for Evolution in Distributed Applications; Proceedings of the IEEE Workshop on Challenges of Large Applications in Distributed Environments (CLADE), in conjunction with the 13th International Symposium on High Performance Distributed Computing (HPDC-13), Jun. 2004; Honolulu, Hawaii, USA (http://www.cc.gatech.edu/systems/papers/schwan/Agarwala04.pdf).

* cited by examiner

*Primary Examiner* — Rashawn Tillery (57) ABSTRACT

Systems and methods for information exchange using generic data streams, wherein a data stream is sent from one computer system to another, and the receiving computer system is not aware of the structure of the information in the data stream. A header of the data stream includes a description of a data object. A body of the data stream includes information for instances of a data object stored on a computer system. The object is compliant with the description provided in the header of the data stream. The information in the body of the stream is extracted based on the description provided in the header of the data stream. A user interface (UI) is dynamically created based on the description of data object to display portions of the received information, and further to allow a user to change the information.

20 Claims, 8 Drawing Sheets

INFORMATION EXCHANGE USING GENERIC DATA STREAMS

TECHNICAL FIELD

The field of the invention relates generally to data processing and digital processing systems. More specifically, the invention is related to using specific protocols for information exchange within a computer system environment.

BACKGROUND

The current development of information technology is characterized by an abundance of information systems of different kinds providing various services to customers. Regardless of whether these systems are public, or available in a private environment, system integration is a crucial demand in the software and hardware industry. It is common for an enterprise to have more than a few computer systems from different vendors, working simultaneously to achieve a common goal. Typically, the data produced by one information system is required by another system to automate a business process in an enterprise. System integration means that the different information systems communicate efficiently with each other and exchange information for accomplishment of the common goal.

Different information systems generate and store data in different formats and quantities. Software and hardware developers implement various methods to enable smooth and efficient communication between the separate systems. The communication between two information systems could be defined as data exchange based on predefined syntax rules. The rules are necessary to guarantee that the systems understand each other. The structure of the exchanged data is predefined in both systems by the rules, e.g., data fields, data types, parameters and variables, special characters, etc. The predefined syntax rules present a flexibility and universality threshold before the system integration. This threshold corresponds to the amount of resources necessary to establish a communication between two information systems based on common syntax rules.

SUMMARY

Systems and methods for information exchange using generic data streams are described, wherein a data stream is sent from one computer system to another, and the receiving computer system is not aware of the structure of the information in the data stream. A header of a data stream is received from a remote computer system. The header of the data stream includes a description of a data object. A body of the data stream is also received from the remote computer system. The body of the data stream includes information, for instance, of a data object stored on the computer system and compliant with the description of a data object in the header. The information in the body of the stream is extracted based on the description provided in the header of the data stream. A user interface (UI) is dynamically created based on the data object description. The created UI includes information from the header of the data stream and/or from the body of the data stream. This information is synchronized with the information stored on the remote computer system, if the information is changed in the UI.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 6 is a screenshot of a GUI generated based on a generic data stream, according to one embodiment of the invention.

DETAILED DESCRIPTION

Embodiments of techniques for information exchange using generic data streams are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Generally, the described invention is related to data exchange between two information systems, where one of the systems sends information to the other. The two information systems could work together in same information environment, and could even be different modules in a same information system. Further, the two information systems could be remote computer systems connected via a public computer network, e.g., connected via the Internet. In this document, one of the communicating information systems is called client computer system, or just client system, and the other information system is called server computer system, or just server system. Client system and server system have different roles in the data exchange. The information is sent from the server computer system to the client computer system. The two systems could exchange information about data objects.

A data object is broadly defined in this document as an information entity. For example, a table in a database could be a data object. The columns of the table define the properties of the data object, e.g., the structure of the data object and the relationships with other data objects. The rows of the table represent different instances of the data object, where each property of the data object has a value of a particular type. Other examples for a data object are Java™ beans or Enterprise JavaBean™ (EJB) objects. The EJB objects also have properties that hold values per instance. The values of the properties of the data objects are exchanged between server computer system and client computer system by generic data streams, according to one embodiment of the invention. Further, EJB objects could have more advanced features like methods and interfaces that could also be instantiated. Descriptions for these advanced features could be exchanged between computer systems in generic data streams as well.

Figure 1:
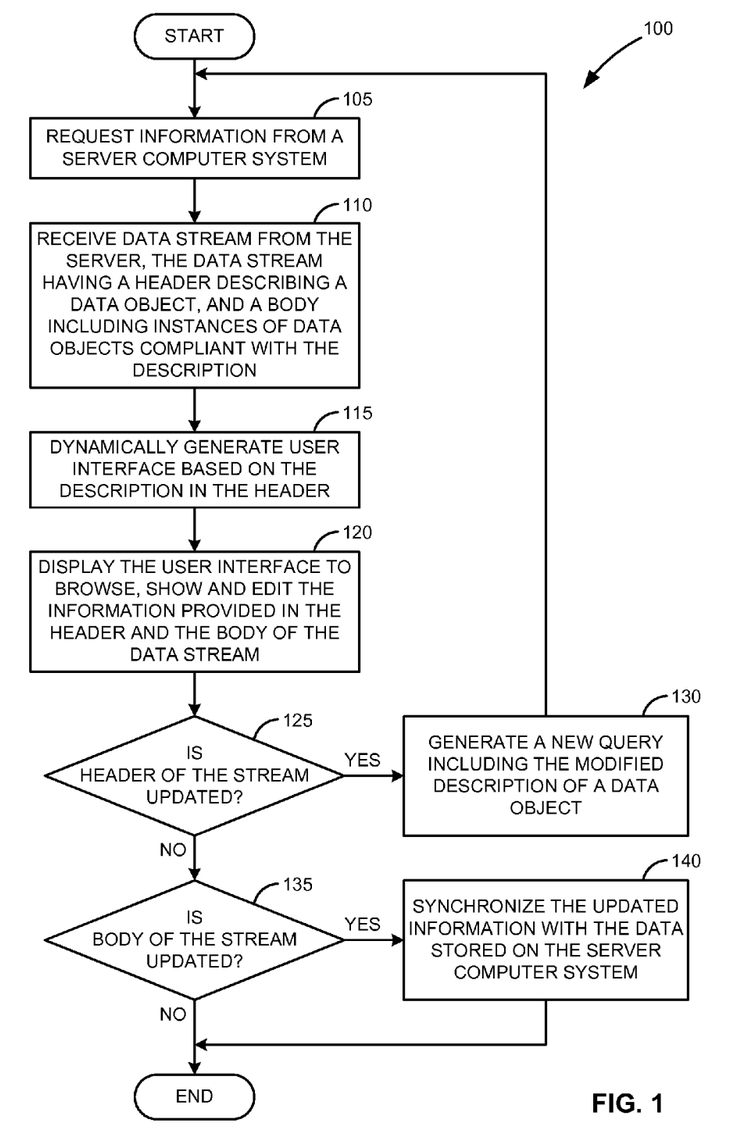
FIG. 1 illustrates a process for communication of data streams between a client computer system and a server computer system, according to one embodiment of the invention.

According to one embodiment of the invention, the communication between a server computer system and a client computer system could be organized as illustrated with process 100 in FIG. 1. At 105 in FIG. 1, a client computer system requests data from a server system. There are different approaches to request data. Usually, various data requests are predefined during a system integration process based on the syntax rules for data exchange between two systems. The information exchange using generic protocol or generic data streams does not require predefinition of syntax rules for data exchange, and respectively, predefinition of data requests. The client system is not aware of the structure and the volume of the information that is stored in the server computer system. The request sent at 105 could be very general, including a keyword, a name of a business object, a type of a business object, a reference to a business task, etc.

The server computer system sends a list of names of data objects hosted or stored in the server system to the client system. Respectively, at 105, the client computer system requests information for a data object with a particular name, without further insight about the structure or the contents of the requested information. Additionally, the request could include a search string or other criteria to filter the retrieved data in response to the request. A particular type or kind of data object could be retrieved. The request could also specify an index to retrieve information for a particular instance of a specified data object. The index indicates a position of the instance in an order of persisted instances of the data object. Further, the request could specify for how many instances of the data object to retrieve information, starting from the first instance, or from the instances with a particular index.

At 110, the client computer system receives a generic data stream from the server computer system. The client computer system is not aware of the structure of the received information. The generic data stream has two parts. The first part is a header that contains metadata describing the structure of the information. The second part of the received data stream is a body that is structured according to the description in the header. The body of the data stream contains information retrieved from the server computer system. The metadata in the header of the data stream includes a description of a data object, and the body of the data stream includes one or more instances of a data object compliant with the description. Metadata provides rules necessary for correct interpretation of the information included in the body of the data stream. The data stream could be formatted as an electronic file, and exchanged over a computer network using universal layer protocol, e.g., hyper text transport protocol (HTTP). The exact format of the electronic file could be compliant with a standard language to enable the client system to distinguish and read the metadata. For example, a data stream could be formatted as an extensible markup language (XML) file.

In one embodiment of the invention, metadata includes definitions of one or more properties of a data object. A data object property definition provides identifiers, e.g., name of the property and a type corresponding to the property. The property could be described as an information field of a data object. The corresponding type specifies the data type of the information that could be stored in the field. A data object property could also be a reference to other data objects. References indicate that the data object described in the metadata is part of a tree structure of data objects. The corresponding type of the reference property provides criteria about how to identify a child data object nested in the described data object. One of the possible criteria is a location of one or more instances of the child object nested in the instances of the parent object. A location reference is similar to a hyperlink providing a unified resource location (URL) within the server computer system, or within another computer system, depending on where the nested instances are stored.

Further, a property could be a complex property defined as a combination of two or more component properties. A complex property could present information from different types. The definition of a complex property includes a complex property identifier, two or more component property identifiers, and types corresponding to the component properties. In one embodiment of the invention, metadata could also define morphable properties. A morphable property of a data object presents information of different types in different instances of the data object. In other words, the morphable properties have alternative corresponding types. Complex and morphable properties extend the flexibility of the metadata to describe a data object of a particular kind, even when the data object is instantiated by different applications to persist different types of information.

The body of the data stream received at 110 includes information extracted from one or more instances of a data object compliant with the metadata. In one embodiment of the invention, the extractions for the different instances are listed in the electronic file one after another, with appropriate tags for beginning and ending of an instance extraction. Each extraction included in the body of the data stream provides a separate set of values for the properties defined in the header of the data stream. Table 1 illustrates a simple data stream formatted as an XML file, including extraction from only one instance of a data object.

TABLE 1

```
Data Stream
<ol // tag that marks the beginning of the data stream
    id="locales" r="1" a="1" o="0" s="0" c="1" m="1">
    <o p="locales" d="0"> // the header of the data stream
        <p id="id" t="s36" u="0" i="0">Id</p>
        <p id="ent" t="ol" i="1">Entries</p>
    </o>
    <m n="0"> // the body of the data stream, first extraction
        <o id="en">
            <p id="id">
                <v>en</v>
            </p>
            <p id="ent">
                <ol id="locales/en/ent" i="1" a="1" s="0" c="0"
                m="-1"/>
            </p>
            English
        </o>
    </m>
    Localization
</ol>
```

Going back to FIG. 1, process 100 continues at 115 with creating a user interface (UI) at the client computer system. In one embodiment of the invention, the UI that is created is a graphical user interface (GUI). The UI is dynamically generated based on the metadata included in the header of the received data stream. This approach allows the client system to display the information that is included in the data stream at 120. The dynamically generated UI has the necessary structure and controls to display one or more of the properties described in the metadata, to browse or navigate between the properties and between the extracted information, to show the values of the properties included in the data stream, and even to modify the displayed data. The created UI enables user interaction with the information included in the data stream.

At 125, a check is performed to determine whether the information included in the header of the data stream and displayed in the UI has been updated. The check verifies whether the metadata in the data stream has been updated. By way of example, such an update could include change of a property type, including definition of a new property, deleting a definition of an existing property, etc. According to one embodiment of the invention, if the metadata has been updated, the description of a data object is no longer compliant with the retrieved information in the body of the data stream. Therefore, at 130, a new data query is generated based on the modified metadata. The new query is included in a new request to the server computer system, according to one embodiment of the invention.

At 135, a check is performed to determine whether the body of the data stream has been updated. According to one embodiment of the invention, the UI provides functionality to change the value of a property for an instance of the data object included in the body of the data stream. The new value is of a type corresponding to the type of the property. In case of a morphable property, a user could enter a new value of any of the alternative types. When the value of a property of an instance has been changed, at 140, the updated information is synchronized with the data stored in the server computer system to avoid discrepancies. The synchronization could be performed using any of the existing technologies, including messaging, distributed transactions, sending a modified data stream from the client computer system to the server system, etc.

Figure 2:
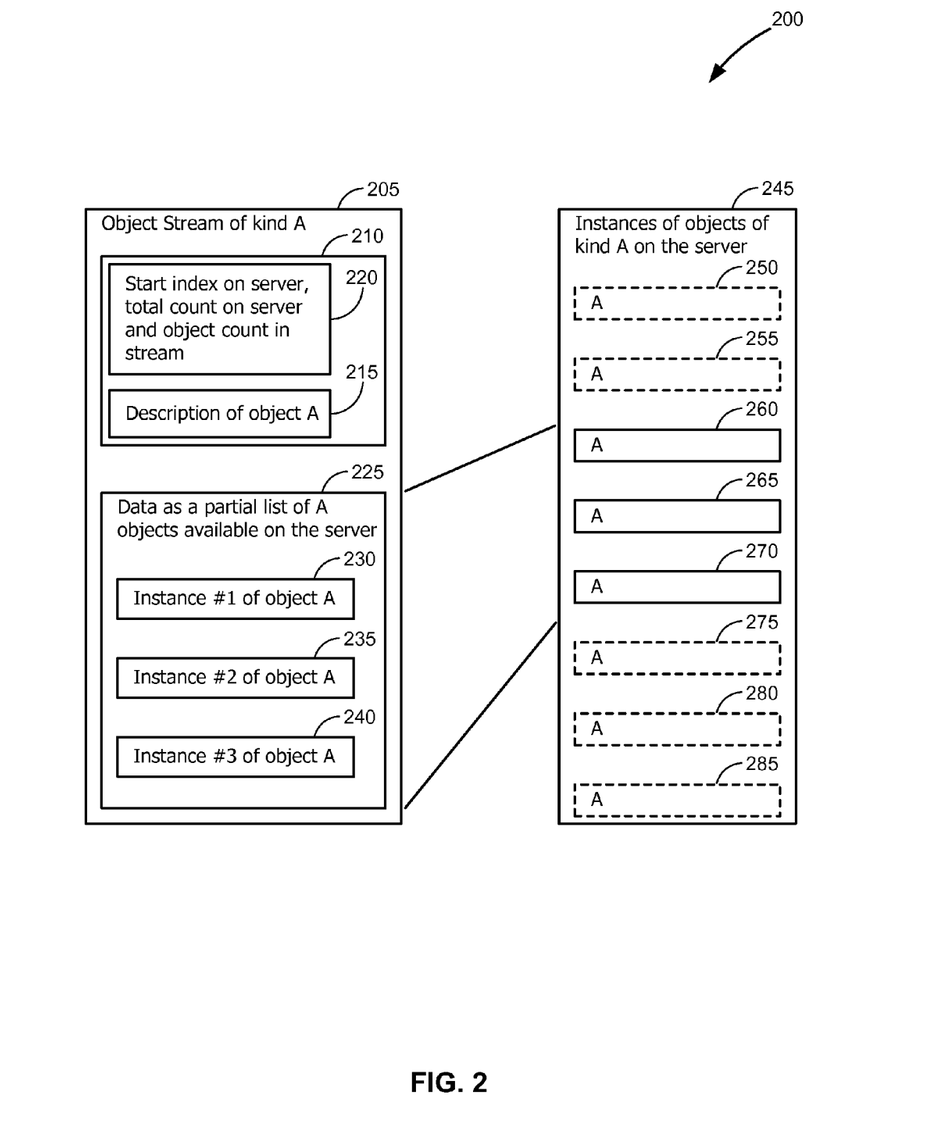
FIG. 2 is a block diagram of a generic data stream illustrating a correspondence to a data object hosted in a server computer system, according to one embodiment of the invention.

FIG. 2 shows correspondence 200 between the information included in the body 225 of data stream 205, and the instances of a data object 245 stored in a server computer system. Data stream 205 is divided into two sections that are header 210 and body 225. Header 210 includes metadata 215 comprising a description of a data object 245 of a particular kind or type. Data object 245 has type and properties compliant with metadata 215. There are a number of instances 250 to 285 of data object 245 stored in server computer system. Information for instances 260, 265 and 270 of data object 245 is retrieved in body 225 of data stream 205. The retrieved information is included in extractions 230, 235 and 240, respectively. Extractions 230, 235 and 240 contain values of the properties of data object 245 described in metadata 215, the values are retrieved from the corresponding instances. In one embodiment of the invention, instances 250 to 285 of data object 245 are organized and ordered using indexes and pages in the server computer system. Each instance has an index corresponding to a position of the instance in the order of instances. Each page has a maximum number of indexes that it could contain. A data request could specify indexes of instances to be retrieved, total number of instances to be retrieved, what page of the instances of a particular data object to be retrieved, etc.

Header 210 also includes additional information 220 that could be helpful for the recipient of the data stream 205. By way of example, additional information 220 could include the total number of data objects 245 of a particular type available on the server computer system, the total number of instances of a data object 245 compliant with metadata 215 available on the server, an index of an instance retrieved in body 225 of data stream 205, and the total number of the retrieved instances. In one embodiment of the invention, additional information 220 includes an index of the first instance retrieved in body 225. In one embodiment of the invention, a user could base a new data request on the additional information 220. For example, the new request could retrieve instances of data object 245 that are not included in data stream 205.

Generally, the client computer system is not aware of the structure of the requested data object. The number of the instances persisted in the server system is also unknown for the client system. The client computer system is not aware of the volume of the information that will be transferred from the server computer system. The requested data object could be part of a tree structure of objects hosted in the server computer system. In such a case, a simple request could retrieve torrents of data. To avoid unlimited information transfers, an embodiment of the invention provides an opportunity to retrieve information page by page, and to browse tree-structured data by levels. Thus, not all information is streamed or transported, which keeps the volume of data received at the client computer system within quantifiable limits. When streaming an object instance, server computer system places a link to a subordinated data stream containing information for a child object of the requested data object. Thus, client computer system receives information about a limited number of instances of the requested data object. Links or references provide a way to drill down on instances of child objects, e.g., to receive data streams with information for instances of a subordinated object by pages.

Figure 3:
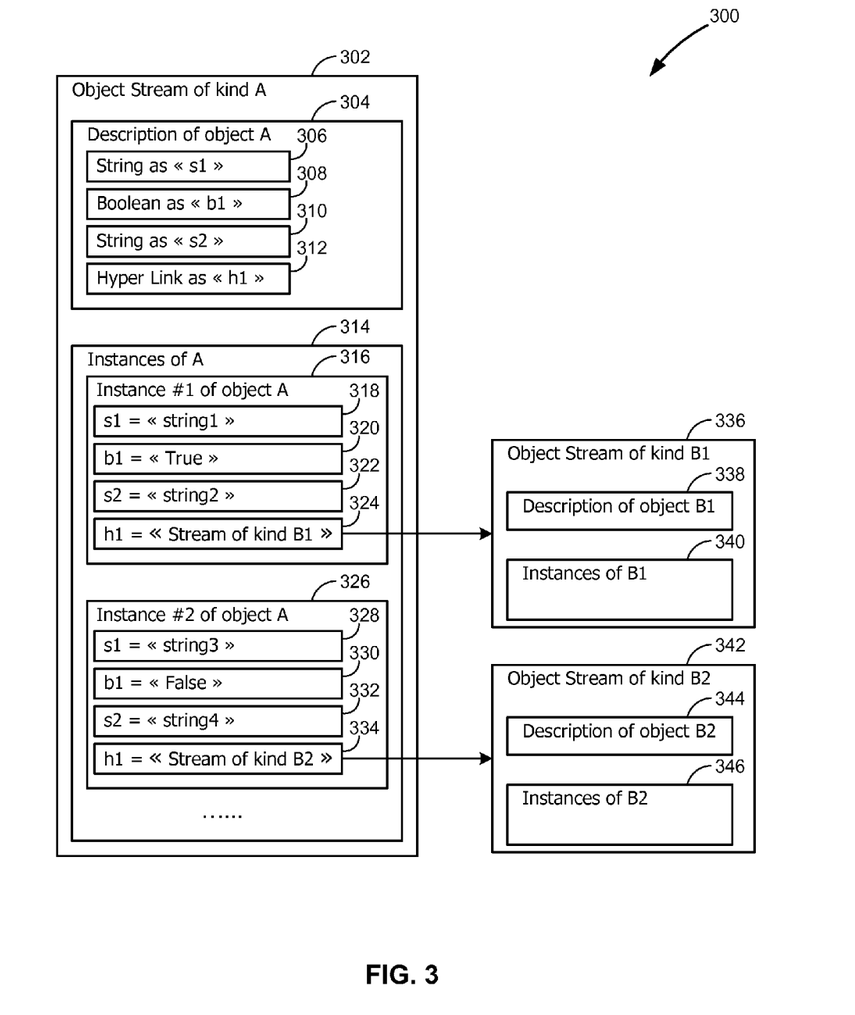
FIG. 3 is a block diagram of a tree-like structure including a main data stream and subordinated data streams, nested in the main data stream, according to one embodiment of the invention.

FIG. 3 shows a tree-like data structure 300 including main data stream 302 and subordinated or nested data streams 336 and 342. Data streams 302, 336 and 342 are generated in server computer system and are sent to client computer system upon request. Data stream 302 includes header 304 with metadata describing a data object, and body 314 containing extractions 316 and 326 containing information for two instances of a data object compliant with the metadata. Header 304 includes definitions 306 to 312, each definition specifying a different property of the data object. In one embodiment of the invention, definition 306 specifies property with identifier "s1" and corresponding type "String", as illustrated in the figure. Similarly, definitions 308 and 310 specify properties "b1" and "s2" of types "Boolean" and "String", respectively.

Definition 312 specifies a reference property with identifier "h1" and corresponding type "Hyper Link". The reference property indicates the nested or tree-like structure of the described data object, where the instances of the data object include instances of other data objects. Extraction 316 includes information from an instance of a data object compliant with the description in header 304. The instance is stored in the server computer system. Extraction 316 contains tuples 318 to 324 providing values from the corresponding instance for each of the properties specified by the definitions 306 to 312. For example, tuple 318 provides value "string1" for the property with identifier "s1", tuple 320 provides value "True" for property "b1", and tuple 322 provides value "string2" for property "s2". Extraction 316 also includes a value for the reference property "h1" in tuple 324. The provided value specifies a location of subordinated data stream 336. The subordinated data stream 336 contains header 338 describing a data object that is subordinated to the main object described in header 304 of main data stream 302. Further, subordinated data stream 336 contains body 340 including one or more instances of a data object compliant with the description in header 338.

In one embodiment of the invention, when information for a main data object from a tree based object structure hosted in the server computer system is retrieved, a main data stream is generated to include values from one or more instances of the data object. Additionally, references to instances of data objects subordinated to the main data object are created, where one or more instances of a subordinated data object are nested in an instance of the main data object. Information for the instances of the subordinated object could be retrieved in one or more subordinated data streams generated together with the main data stream. The reference properties of the instances of the main object could be set to provide a location of the relevant subordinated data streams within the server computer system. It is possible for some of the subordinated data objects to be hosted in other computer systems. Respectively, a reference property could provide a location of a subordinated data stream in terms of a local or global network address.

Extraction 326 contains values of another instance of the data object described in header 304 of data stream 302. As illustrated in FIG. 3, tuple 328 provides value "string3" for property "s1", tuple 330 provides value "False" for property "b1", and tuple 332 provides value "string4" for property "s2". Extraction 326 contains value for reference property "h1" in tuple 334 to specify a location of the corresponding subordinated data stream 342. The subordinated data stream 342 contains header 344 describing a data object that is subordinated to the main object described in header 304 of main data stream 302. Subordinated data stream 342 also contains body 346 including one or more instances of a data object compliant with the description in header 344.

In an alternative embodiment of the invention, reference properties could provide requests or queries to be executed by a computer system hosting the instances of the corresponding subordinated data objects. The execution of the request causes a retrieval of the necessary information from the corresponding subordinated instances. In this case, a subordinated data stream is generated only when requested.

Figure 4:
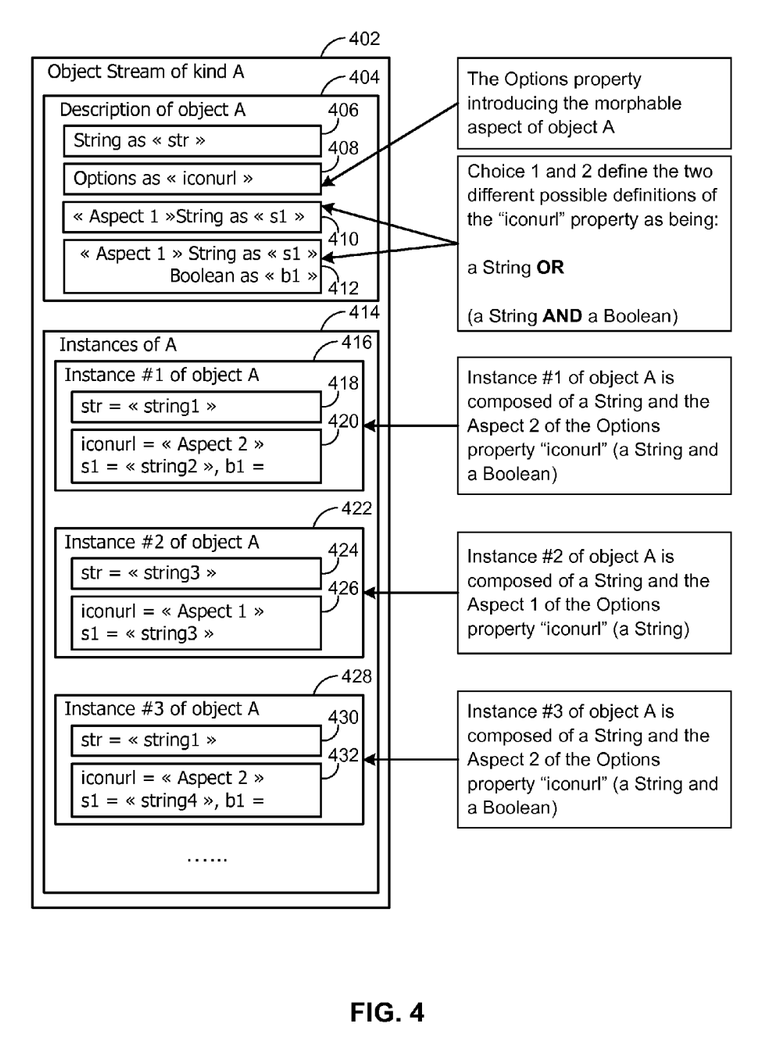
FIG. 4 is a block diagram of a structure of a generic data stream including a definition of a morphable property, according to one embodiment of the invention.

FIG. 4 shows structure 400 of data stream 402 including definition 408 of a morphable property of a data object in header 404. Morphable properties provide alternative definitions of a data object by aspect, or option. Each aspect contains a subordinated definition, or aspect definition, of the morphable property. Aspects could be nested inside other aspects, and an aspect could encompass complex properties. Morphable properties allow defining a data object that covers multiple forms of instances of the data object. The contents of morphable properties may come from various sources and in various formats in the different instances of the data object. Thus, the different variations of the instances of the data object could be extracted in a same data stream.

As illustrated in FIG. 4, the identifier of the morphable property is "iconurl", and the corresponding type assigned is "Option" to introduce the morphable aspect of the described data object. As defined, morphable property "iconurl" is a holder of two alternative properties defined in aspect definitions 410 and 412. Aspect definition 410 specifies option "Aspect1" of property with identifier "s1" and corresponding type "String". Aspect definition 412 specifies option "Aspect2" as a combination of component properties with identifiers "s1" and "b1" and corresponding types "String" and "Boolean", respectively. Header 404 also includes definition 406 of property "str" or type "String".

Data stream 402 further includes extractions 416, 422 and 428 in body 414 presenting values from three different instances of a data object compliant with the metadata in header 404. Tuple 418 of extraction 416 carries value "string1" for property with identifier "str" specified with definition 406. Tuple 420 of extraction 416 has a more complex structure, as it carries values for morphable property "iconurl". The information included in tuple 420 indicates that option "Aspect2" is assigned to property "iconurl", and the component properties "s1" and "b1" corresponding to option "Aspect2" are set to values "string2" and "False", respectively.

Extraction 422 includes tuples 424 and 426. Tuple 424 provides value "string3" for property "str". Tuple 426 indicates that option "Aspect1" is assigned to morphable property "iconurl", and the respective property "s1" is set to value "string3". Last extraction 428 contained in body 414 includes tuples 430 and 432. Tuple 430 provides value "string1" for property "str". Tuple 432 indicates that option "Aspect2" is assigned to morphable property "iconurl". The component properties "s1" and "b1" corresponding to option "Aspect2" of property "iconurl" are set to "string4" and "True", respectively.

In one embodiment of the invention morphable properties provide an opportunity for a user to modify the structure of an instance of a data object. A graphical user interface (GUI) could include a control based on the definition of the morphable property. The control allows a user to change a current aspect of the morphable property for a particular instance of the described data object. Further, by using the GUI, the user can change the value of a displayed property.

Figure 5A:
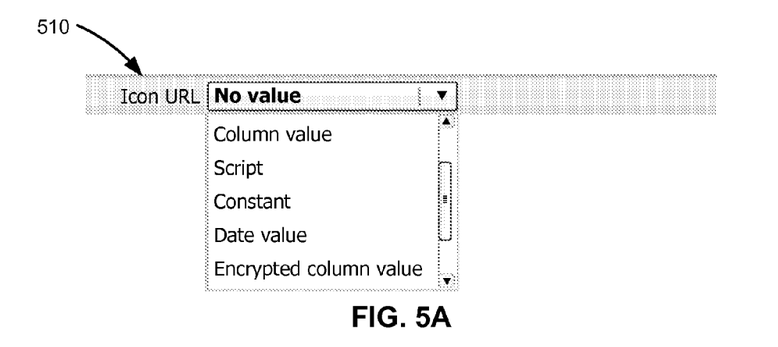
FIG. 5A is a block diagram of a graphical user interface (GUI) control corresponding to a morphable property, according to one embodiment of the invention.

FIG. 5A to FIG. 5D show GUI controls 510 to 540, respectively, generated at a client computer system based on metadata, and rendered to a display device. The GUI controls correspond to morphable properties, e.g., morphable property "Icon URL", defined in the metadata of a data stream received at the client computer system. FIG. 5A shows control 510 as a drop-down menu displaying the different aspects of the morphable property as they are defined. The different aspects specify that the morphable property could be empty, or can hold one of "Column value", "Script", "Constant", "Date value", and "Encrypted column value".

Figure 5B:
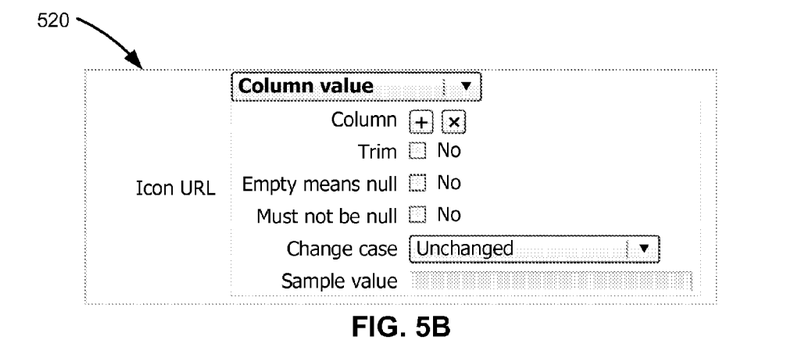
FIG. 5B is a block diagram of a GUI control corresponding to a morphable property, according to one embodiment of the invention.
Figure 5C:
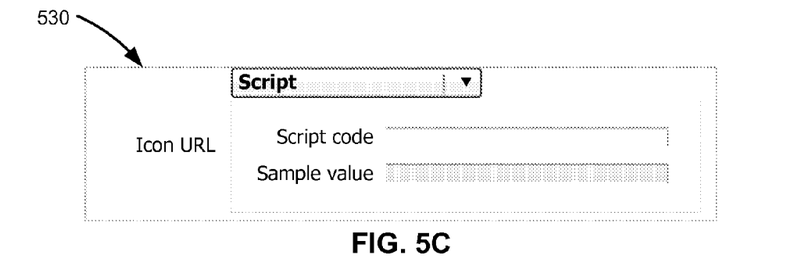
FIG. 5C is a block diagram of a GUI control corresponding to a morphable property, according to one embodiment of the invention.
Figure 5D:
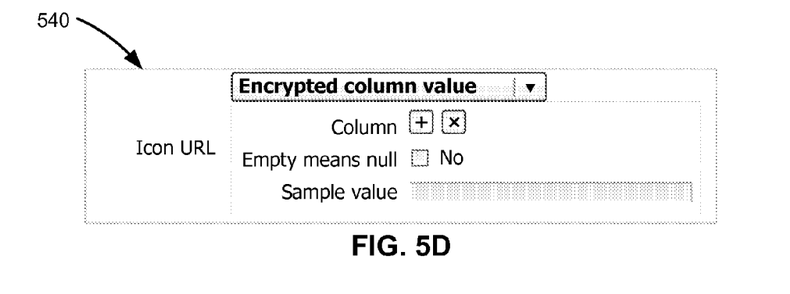
FIG. 5D is a block diagram of a GUI control corresponding to a morphable property, according to one embodiment of the invention.

In FIG. 5B, morphable property "Icon URL" is specified as "Column value", and the corresponding GUI control 520 displays the attributes of a column value for a particular instance of the underlying data object. Further, in FIG. 5C, morphable property "Icon URL" is specified as "Script", and the corresponding GUI control 530 displays the attributes of a script. Finally, in FIG. 5D, morphable property "Icon URL" is specified as "Encrypted column value", and the corresponding GUI control 540 displays the attributes of an encrypted column. A user could edit the displayed attributes, and then, client computer system will synchronize the structure of the respective instance of the data object, and the value that the morphable property holds in the instance.

FIG. 6 is a screen shot of GUI 600, generated by an embodiment of the invention at a client computer system based on a plurality of data streams, received at the client system. There are several areas in the GUI 600. Area 610 shows a number of data streams received at the client computer system. The data streams are displayed by names, and could be sorted by different criteria, e.g., time of generation, time of receiving, time of modifying, alphabetically, etc. Area 610 could also show the properties of a data object described in the header of a selected data stream. Area 620 provides a detailed view of the properties of the data object described in the selected data stream. The detailed view includes a list of the properties, and particular details 630 for the properties including their names, the corresponding identifiers of the properties, the types corresponding to the properties, etc. Additional GUI controls, such as search control 640 and page control 650, could help navigation between the received data streams and the displayed properties.

Figure 7:
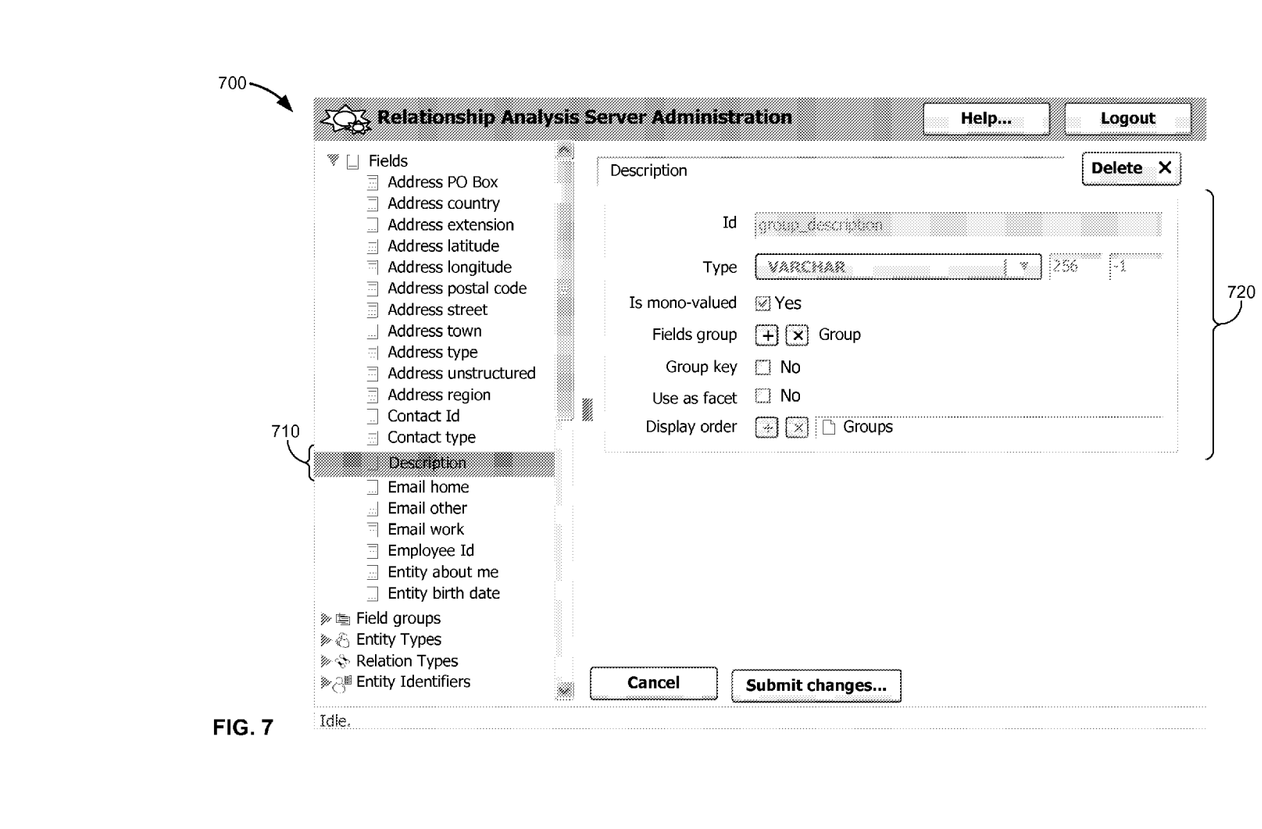
FIG. 7 is a screenshot of a GUI generated based on a property defined in a generic data stream, according to one embodiment of the invention.

When a particular property of a data stream is selected, area 620 changes to display a detailed view of the selected property. FIG. 7 is a screen shot of GUI 700, generated by an embodiment of the invention at a client computer system, showing a detailed view control 720 for selected property 710 of a data stream. Detailed view control 720 is generated based on the definition of the property included in the header of the corresponding data stream. Thus the detailed view control displays all details of the property definition, and it could also display a value from a particular instance of the data object described in the metadata of the stream.

A user could use detailed view control 720 to change an aspect of the selected property, when the selected property is a morphable property. Further, a user could use detailed view control 720 to change the displayed value of the property for a particular instance of the described object. The client computer system could use the changes to the aspect or the value of the property in the GUI 700 to send an update to a particular instance of the described data object stored in the server computer system.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as that produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
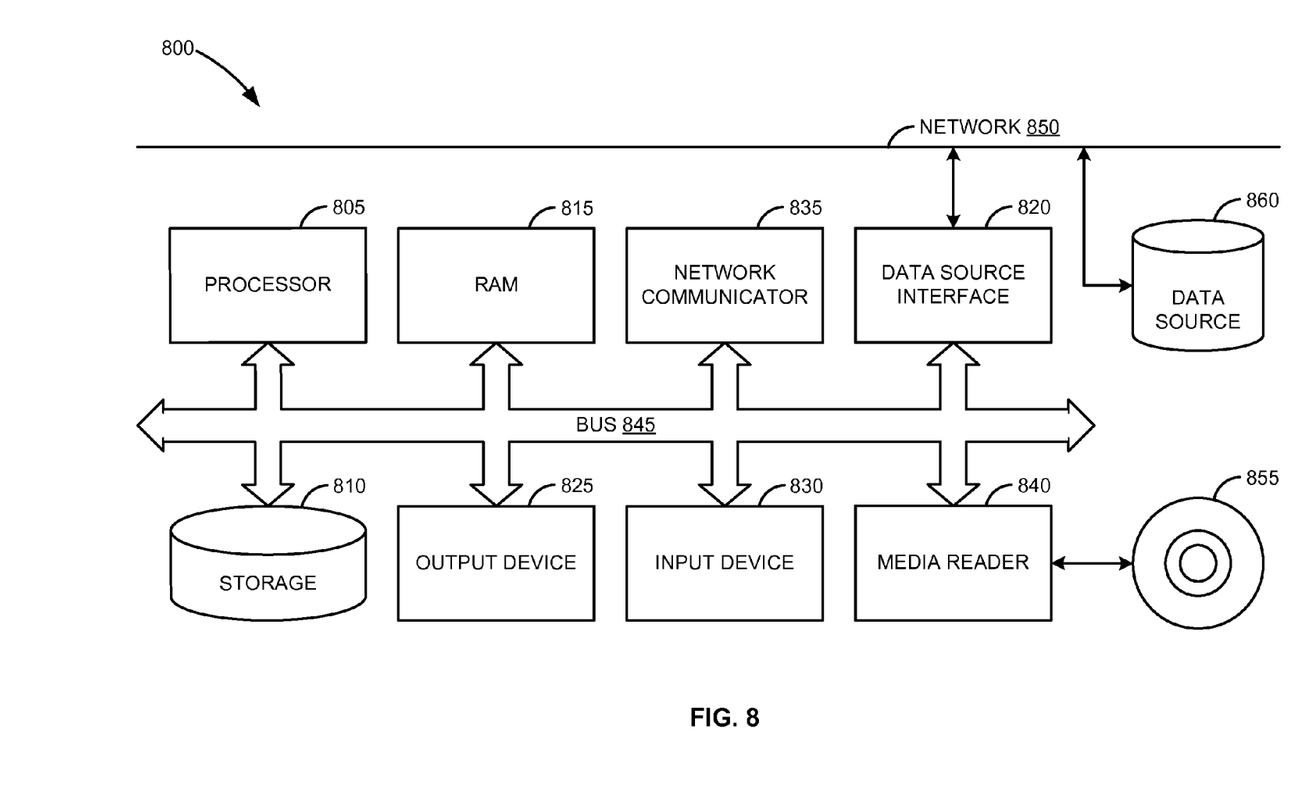
FIG. 8 is a block diagram of an exemplary computer system to execute computer readable instructions for data lifecycle cross-system reconciliation, according to one embodiment of the invention.

FIG. 8 is a block diagram of an exemplary computer system 800. The computer system 800 includes a processor 805 that executes software instructions or code stored on a computer readable medium 855 to perform the above-illustrated methods of the invention. The computer system 800 includes a media reader 840 to read the instructions from the computer readable medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM 815 and performs actions as instructed. According to one embodiment of the invention, the computer system 800 further includes an output device 825 (e.g., a display) to provide at least some of the results of the execution as output including, but not limited to, visual information to users and an input device 830 to provide a user or another device with means for entering data and/or otherwise interacting with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860 at a server computer system. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory article of manufacture comprising computer readable instructions stored thereon which when executed by a processor cause a computing environment to:
   receive, from a remote computer system, a data stream containing information from at least one instance of a data object with a structure unknown to the computing environment, the data stream comprising:
   a header, wherein the header of the data stream includes metadata describing one or more structure elements of the data object, and
   a body, wherein the body of the data stream includes the information from the at least one instance of the data object;
   extract the information from the at least one instance of the data object from the body of the data stream in accordance with the one or more structure elements described in the metadata; and
   dynamically create a user interface (UI) based on the one or more structure elements of the data object, wherein the UI includes
   a first area to show the one or more structure elements based on a description in the metadata,
   a second area to present information from the at least one instance of the data object corresponding to a selected element from the one or more structure elements, and
   a UI control mechanism to allow a user to select the element of the one or more structure elements, and to change a structure of the selected element or the information from the at least one instance of the data object corresponding to the selected element.

2. The article of manufacture of claim 1, comprising further computer readable instructions stored thereon which when executed by the processor cause the computing environment to:
   send a synchronization request to the remote computer system in response to a change in the structure of the selected element or in the information from the at least one instance of the data object corresponding to the selected element, the synchronization request including the change.

3. The article of manufacture of claim 1, comprising further computer readable instructions stored thereon which when executed by the processor cause the computing environment to:
   receive supplementary information in the header of the data stream related to the data object, wherein the supplementary information is selected from a group consisting of:
   a default value of a property of the data object;
   a start index indicating a position of an instance in an order of instances of the data object persisted in a computer system, wherein information from the instance with the start index position is included into the body of the data stream;
   a number of instances of the data object persisted in the computer system from which information is included in the body of the data stream; and
   a total number of instances of the data object persisted in the computer system.

4. The article of manufacture of claim 1, comprising further computer readable instructions stored thereon which when executed by the processor cause the computing environment to:
   read from the metadata a definition of a property of the data object indicative of a structure element of the one or more structure elements of the data object, wherein the definition of the property includes a name of the property and a type corresponding to the property.

5. The article of manufacture of claim 1, comprising further computer readable instructions stored thereon which when executed by the processor cause the computing environment to:
   read from the metadata a definition of a hyperlink property of the data object indicative of a nested structure element of the one or more structure elements of the data object, wherein each instance of the data object includes a reference to at least one instance of another data object.

6. The article of manufacture of claim 1, comprising further computer readable instructions stored thereon which when executed by the processor cause the computing environment to:

read from the metadata a definition of a compound property of the data object indicative of a compound structure element of the one or more structure elements of the data object, wherein the definition of the compound property includes a name of the compound property and a combination of types corresponding to the compound property.

7. The article of manufacture of claim 1, comprising further computer readable instructions stored thereon which when executed by the processor cause the computing environment to:

read from the metadata a definition of a morphable property of the data object indicative of a morphable structure element of the one or more structure elements of the data object, wherein the definition of the morphable property includes a name of the morphable property and a plurality of alternative types or combinations of types corresponding to the morphable property.

8. The article of manufacture of claim 1, comprising further computer readable instructions stored thereon which when executed by the processor cause the computing environment to:

read from the body of the data stream a name of a property and a value of the property, wherein the value is of a type that corresponds to the property.

9. A computer implemented method for information exchange using generic data streams, the method comprising:

receiving, from a remote computer system, a data stream containing information from at least one instance of a data object with a structure unknown to the computer, the data stream comprising:
  a header, wherein the header of the data stream includes a description of the data object, and
  receiving a body, wherein the body of the data stream includes information from the at least one instance of the data object;
extracting the information from the at least one instance of the data object from the body of the data stream based on the description in the header of the data stream; and
dynamically creating a user interface (UI) based on the description in the header of the data stream to include information from one or more of the header of the data stream and the body of the data stream.

10. The method of claim 9 further comprising:
sending a synchronization request to the remote computer system in response to a change of the description in the header of the data stream or in response to a change in the extracted information from the body of the data stream, the synchronization request including the change.

11. The method of claim 9, wherein receiving the header of the data stream comprises:
receiving supplementary information related to the data object, wherein the supplementary information is selected from a group consisting of:
  a default value of a property of the data object;
  a start index indicating a position of an instance in an order of instances of the data object persisted in a computer system, wherein the instance with the start index position is retrieved in response to the query request;
  a number of instances of the data object retrieved from the computer system in response to the query request; and
  a total number of instances of the data object persisted in the computer system.

12. The method of claim 9, wherein receiving the header of the data stream comprises:
receiving a definition of a property of the data object indicative for the structure of the data object, wherein the definition of the property includes a name of the property and a type corresponding to the property.

13. The method of claim 9, wherein receiving the header of the data stream comprises:
receiving a definition of a hyperlink property of the data object indicative for a nested structure of the data object, wherein each instance of the data object includes a reference to at least one instance of another data object.

14. The method of claim 9, wherein receiving the header of the data stream comprises:
receiving a definition of a compound property of the data object, wherein the definition of the compound property includes a name of the compound property and a combination of types corresponding to the compound property.

15. The method of claim 9, wherein receiving the header of the data stream comprises:
receiving a definition of a morphable property of the data object, wherein the definition of the morphable property includes a name of the morphable property and a plurality of alternative types or combinations of types corresponding to the morphable property.

16. The method of claim 9, wherein receiving the body of the data stream comprises:
receiving a name of a property and a value of the property, wherein the value is of a type that corresponds to the property.

17. A computer system for processing streamed data object instances, the system comprising:
a processor; and
a memory coupled to the processor and storing instructions, which when executed from the memory, cause the processor to:
  receive a data stream containing information from at least one instance of a data object with a structure unknown to the computer system, the data stream comprising:
    as a response to the requesting:
      a header including a description of one or more structure elements of the data object, and
      a body including the information from the at least one instance of the data object,
  extract information from the body of the data stream based on the description in the header of the data stream, and
  dynamically create a user interface (UI) based on the description in the header of the data stream to include information from one or more of the header of the data stream and the body of the data stream.

18. The system of claim 17 further comprising:
a display device coupled to the memory to render the created UI.

19. The system of claim 17, wherein the memory further storing instructions, which when executed from the memory, cause the processor to:
generate a query request, wherein the query request comprises criteria selected from a group consisting of:
  a data object name;

a data object kind;

a search string;

a start index indicating a position of an instance in an order of instances of a requested data object persisted in a computer system; and a number of instances of the requested data object to retrieve.

20. The system of claim 17, wherein the memory further storing instructions, which when executed from the memory, cause the processor to:

generate a synchronization request, wherein the synchronization request includes information for a change in one or more of the header of the data stream and the body of the data stream.

* * * * *